(12) United States Patent
Edelman et al.

(10) Patent No.: US 9,221,627 B2
(45) Date of Patent: Dec. 29, 2015

(54) CUT EXTRUDATE DISPERSAL HOOD

(71) Applicants: Matthew James Edelman, Sabetha, KS (US); Dennis Howard Baumgartner, Sabetha, KS (US); Dennis R. Hartter, Sabetha, KS (US); Jason Dean Selland, Powhattan, KS (US); Marc L. Wenger, Sabetha, KS (US)

(72) Inventors: Matthew James Edelman, Sabetha, KS (US); Dennis Howard Baumgartner, Sabetha, KS (US); Dennis R. Hartter, Sabetha, KS (US); Jason Dean Selland, Powhattan, KS (US); Marc L. Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 293 days.

(21) Appl. No.: 13/626,683

(22) Filed: Sep. 25, 2012

(65) Prior Publication Data
US 2014/0087047 A1    Mar. 27, 2014

(51) Int. Cl.
*A23P 1/12* (2006.01)
*B65G 53/04* (2006.01)
*B29C 47/08* (2006.01)
*B29C 47/12* (2006.01)
*B29C 47/60* (2006.01)
*B29C 47/00* (2006.01)
*B01J 2/04* (2006.01)
*B29C 47/88* (2006.01)
*B29B 13/04* (2006.01)
*B29B 9/06* (2006.01)
*A23L 1/00* (2006.01)
*A21C 11/16* (2006.01)

(52) U.S. Cl.
CPC . *B65G 53/04* (2013.01); *A23P 1/12* (2013.01); *B29C 47/08* (2013.01); *B29C 47/0816* (2013.01); *B29C 47/122* (2013.01); *B29C 47/6025* (2013.01); *A21C 11/16* (2013.01); *A23L 1/0076* (2013.01); *A23L 1/0079* (2013.01); *A23P 1/125* (2013.01); *B01J 2/04* (2013.01); *B29B 9/06* (2013.01); *B29B 13/045* (2013.01); *B29C 47/0011* (2013.01); *B29C 47/8815* (2013.01)

(58) Field of Classification Search
CPC ......... A23P 1/12; A23P 1/125; A23L 1/0076; A23L 1/0079; A21C 11/16; A21C 11/22; B29B 9/06; B29B 9/065; B29B 13/045; B29C 47/0011; B29C 47/8815; B29C 47/08; B29C 47/0816; B29C 47/122; B01J 2/04; B65G 53/04
USPC ........... 425/72.1, 404, 445, 6, 67, 190, 302.1, 425/307, 311, 313
See application file for complete search history.

(56) References Cited

U.S. PATENT DOCUMENTS 3,343,213 A * 9/1967 Fritsch ............................ 425/313
3,415,917 A * 12/1968 Toyama et al. ................. 264/142

(Continued)

FOREIGN PATENT DOCUMENTS

EP    541815 A1 * 5/1993 ................ B29B 9/06

*Primary Examiner* — Seyed Masoud Malekzadeh
(74) *Attorney, Agent, or Firm* — Hovey Williams LLP

(57) ABSTRACT

A product-spreading hood assembly (10) for use with a die unit (128) includes a deflector (14) having wall structure defining a product inlet opening (90) and a product outlet opening (92); the deflector (14) is preferably generally frustoconical in shape and is supported by a housing (12). An optional air delivery assembly (16) allows air currents to be directed from the area of the inlet (90) towards outlet (92) to facilitate separation of discrete products. Advantageously, the air currents are delivered in a circumferential fashion about the die unit (128). Use of the hood assembly (10) serves to separate high moisture or "sticky" extrudates, thereby preventing agglomeration thereof.

15 Claims, 4 Drawing Sheets

(56) References Cited

U.S. PATENT DOCUMENTS

| | | | |
|---|---|---|---|
| 3,491,829 A * | 1/1970 | Kazuhiro et al. | 165/47 |
| 4,099,900 A * | 7/1978 | Bradbury et al. | 425/313 |
| 4,243,181 A * | 1/1981 | Hench | 241/142 |
| 4,300,877 A * | 11/1981 | Andersen | 425/67 |
| 4,954,352 A * | 9/1990 | Luker | 425/296 |
| 5,063,002 A * | 11/1991 | Luker | 264/12 |
| 5,849,347 A * | 12/1998 | Huber et al. | 426/289 |
| 2004/0142081 A1* | 7/2004 | Durand et al. | 426/516 |
| 2005/0077644 A1* | 4/2005 | Bryan et al. | 264/143 |
| 2008/0254199 A1* | 10/2008 | Orcutt et al. | 426/656 |
| 2010/0187707 A1* | 7/2010 | Muerb | 264/14 |

* cited by examiner

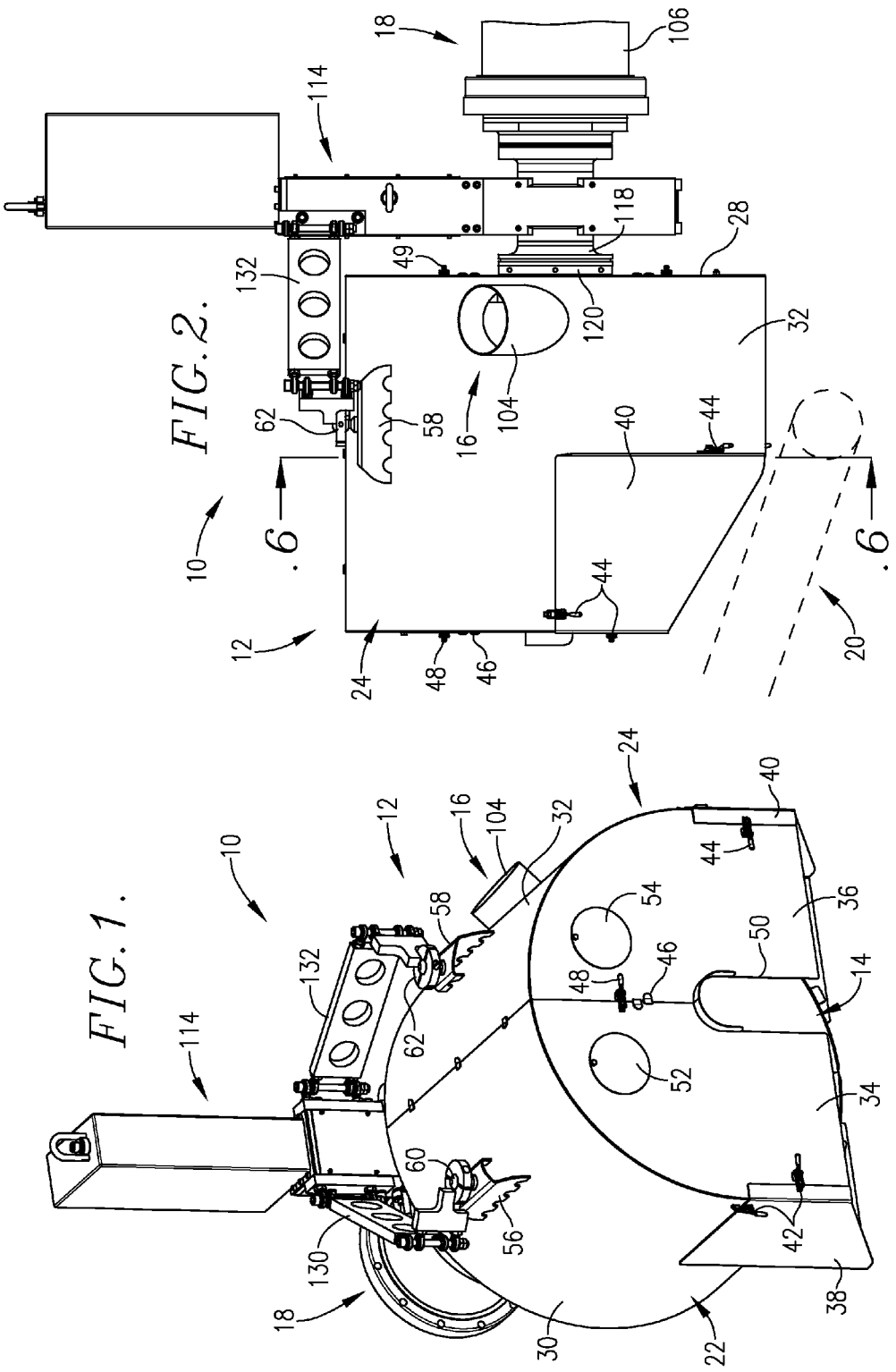

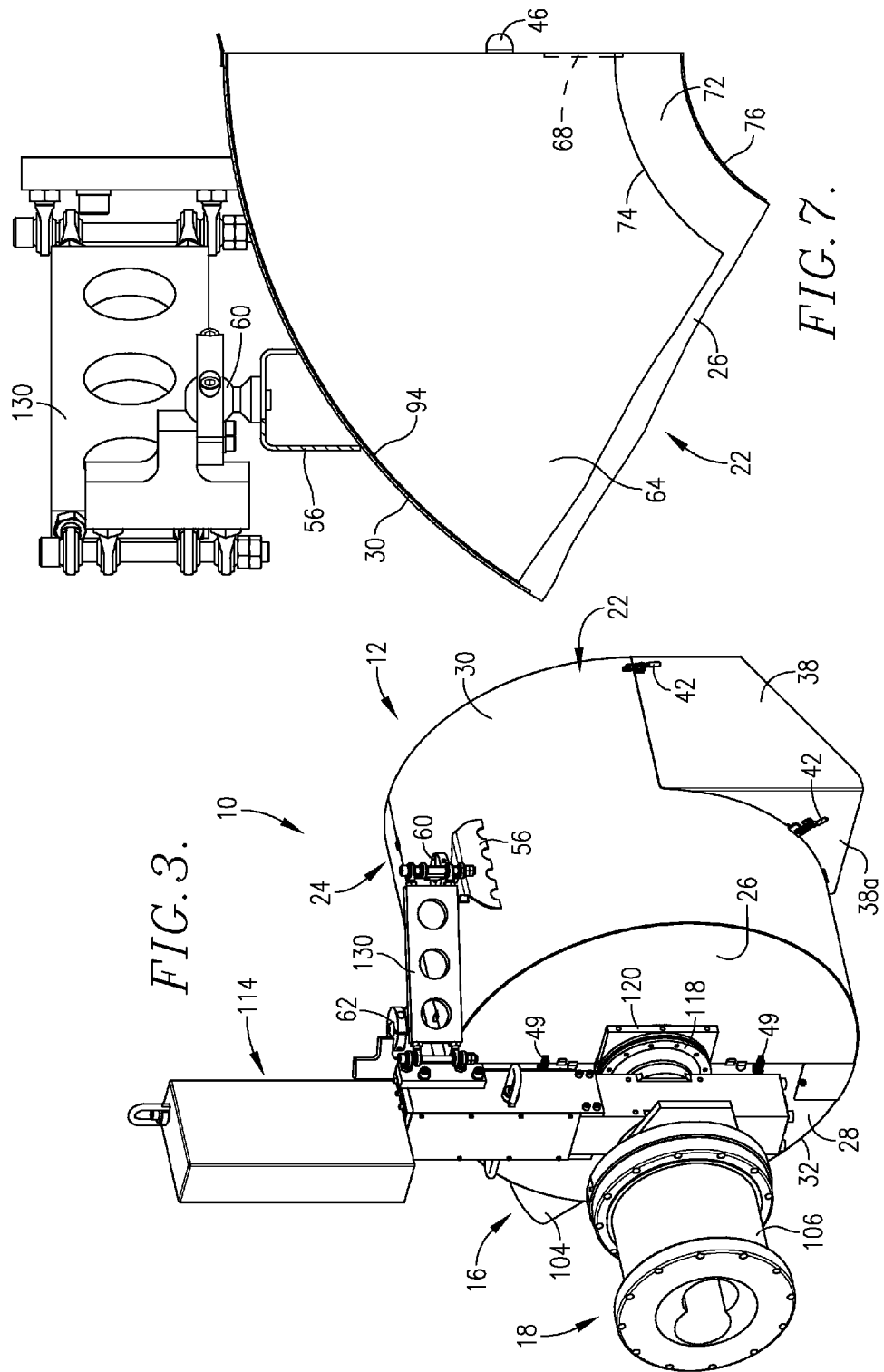

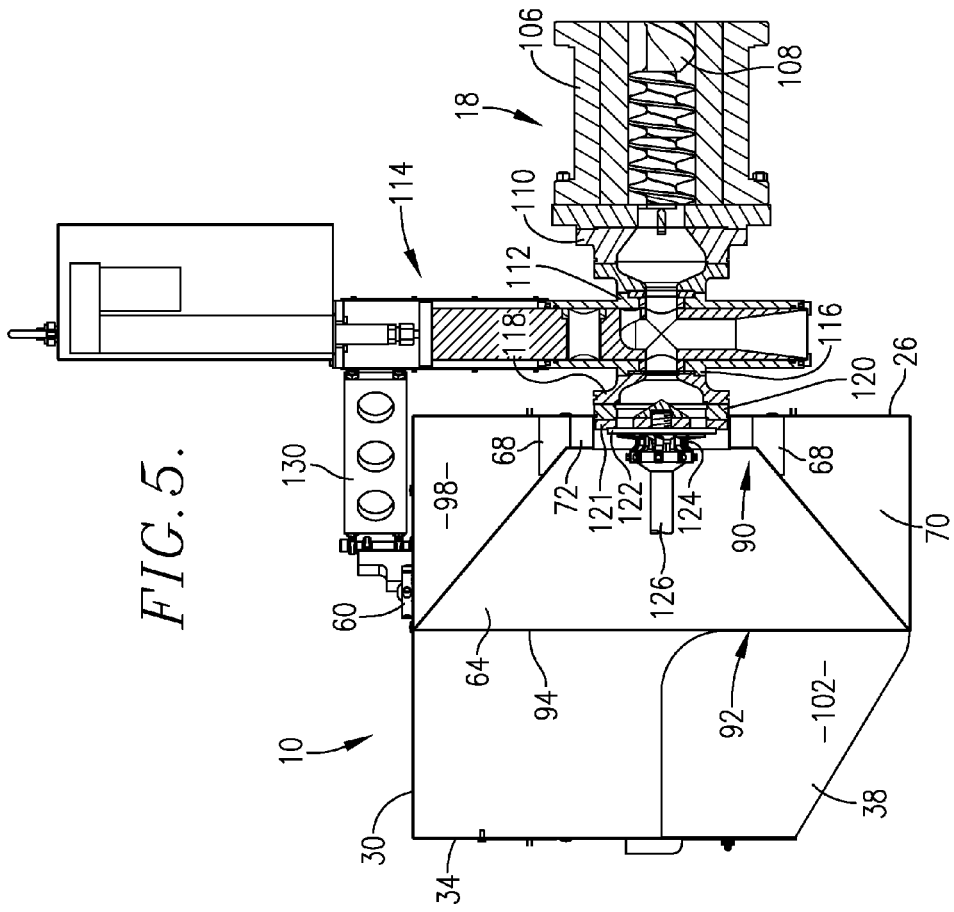
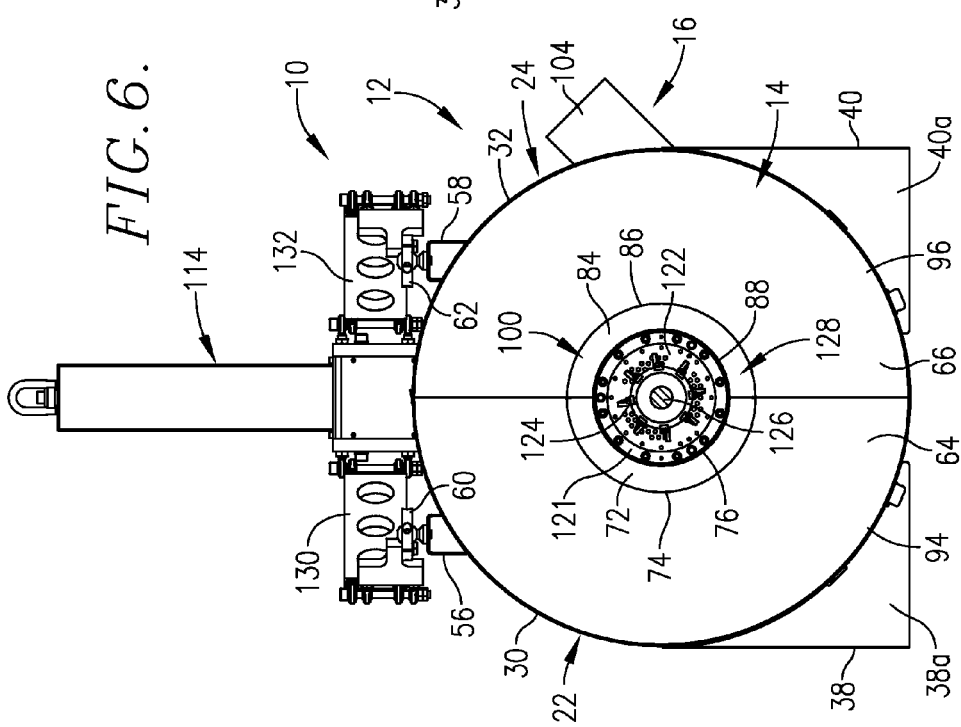

CUT EXTRUDATE DISPERSAL HOOD

BACKGROUND OF THE INVENTION

1. Field of the Invention

The present invention is broadly concerned with a product-spreading hood assembly operable for use with an outlet die unit in order to separate discrete products issuing from the die to prevent agglomeration of the products. More particularly, the invention is concerned with such apparatus, and corresponding methods, wherein a substantially frustoconical deflector is disposed about the die unit to deliver the extrudate to a downstream dryer or other processing device in a separated condition. The invention is particularly useful in the production of high moisture or otherwise "sticky" extrudates normally having a tendency to agglomerate.

2. Description of the Prior Art

Extrusion cooking systems have long been used for the preparation of human foods and animal feed products. Broadly speaking, such extrusion systems include an elongated extruder barrel with one or more elongated, axially rotatable, helically flighted extruder screws within the barrel, together with a downstream restricted orifice extrusion die. In typical processing, the feed ingredients are fed into and through the extruder barrel where they are subjected to increasing levels of heat, pressure and shear in order to at least partially cook the ingredients and form an extrudate. This extrudate may be cut or otherwise subdivided at or downstream of the die. Thereafter, the subdivided extrudate is often subjected to post-extrusion treatments such as surface application of fats and drying.

For many types of conventional extrudates, these extrusion systems operate smoothly. However, in certain cases, the food or feed formulas have a tendency to produce very sticky products. In such instances, the extrudates may tend to agglomerate adjacent the die or as the extrudates fall onto a conveyor or other take-away equipment. For example, the high moisture products described in co-pending application Ser. No. 13/626,644 entitled "Production of Engineered Feed or Food Ingredients by Extrusion," may tend to excessively agglomerate.

There is accordingly a need in the art for improved apparatus associated with a die unit in order to maintain the cut extrudate issuing from the die unit in a separated condition until such time as the extrudates are sufficiently dried or otherwise processed to over come the tendency to agglomerate.

SUMMARY OF THE INVENTION

The problems outlined above are largely, if not entirely, ameliorated by provision of a specialized product-spreading hood assembly operable to be placed adjacent an outlet die unit in order to separate discrete products issuing from the die unit. The hood assembly comprises a deflector having wall structure defining a product inlet opening with a first cross-sectional area and a product outlet opening with a second cross sectional are greater than the first cross-sectional area, with a product-receiving area between the inlet and outlet openings. Preferably, the deflector wall structure is generally frustoconical in shape with a relatively small product inlet opening located in generally circumscribing relationship about the die unit, and a relatively large product outlet opening spaced from the inlet opening. In addition, a housing disposed about and supporting the deflector and extending along the length of the deflector and beyond the product outlet opening to present a product confinement zone, the zone having an open bottom so that products from the outlet opening will gravitate from the housing in a substantially separated condition.

In certain instances, operation of the hood assembly is facilitated by means of an air delivery assembly operable to direct air currents from a point proximal to the product inlet opening and into the product-receiving area in a direction towards the outlet opening, with the air currents operable to substantially maintain the discrete products in a separated condition as the products pass through the outlet opening and into the area. Preferably, the air delivery assembly comprises a plenum extending at least partially about the portion of the deflector wall structure defining the product inlet opening, with an airway communicating the plenum so that the air currents are directed into the plenum and pass through the airway into the product-receiving area.

An external housing is provided to support the deflector, with the housing extending along the length of the deflector and beyond to define an open-bottom product confinement zone downstream of the outlet end of the deflector.

BRIEF DESCRIPTION OF THE DRAWINGS

FIG. 1 is a front perspective view of a preferred product delivery hood assembly in accordance with the invention;

FIG. 2 is a side elevational view of the hood assembly;

FIG. 3 is a perspective view of the hood assembly, viewing the rear end thereof opposite that illustrated in FIG. 1;

FIG. 5 is a side vertical sectional view of the hood assembly, illustrating the internal components of the assembly;

FIG. 6 is a vertical sectional view taken along line 6-6 of FIG. 2; and FIG. 7 is an enlarged, fragmentary view partially taken along line 6-6 of FIG. 2, and further illustrating the details of construction of the hood assembly.

DETAILED DESCRIPTION OF THE PREFERRED EMBODIMENT

Figures 4, 5A:
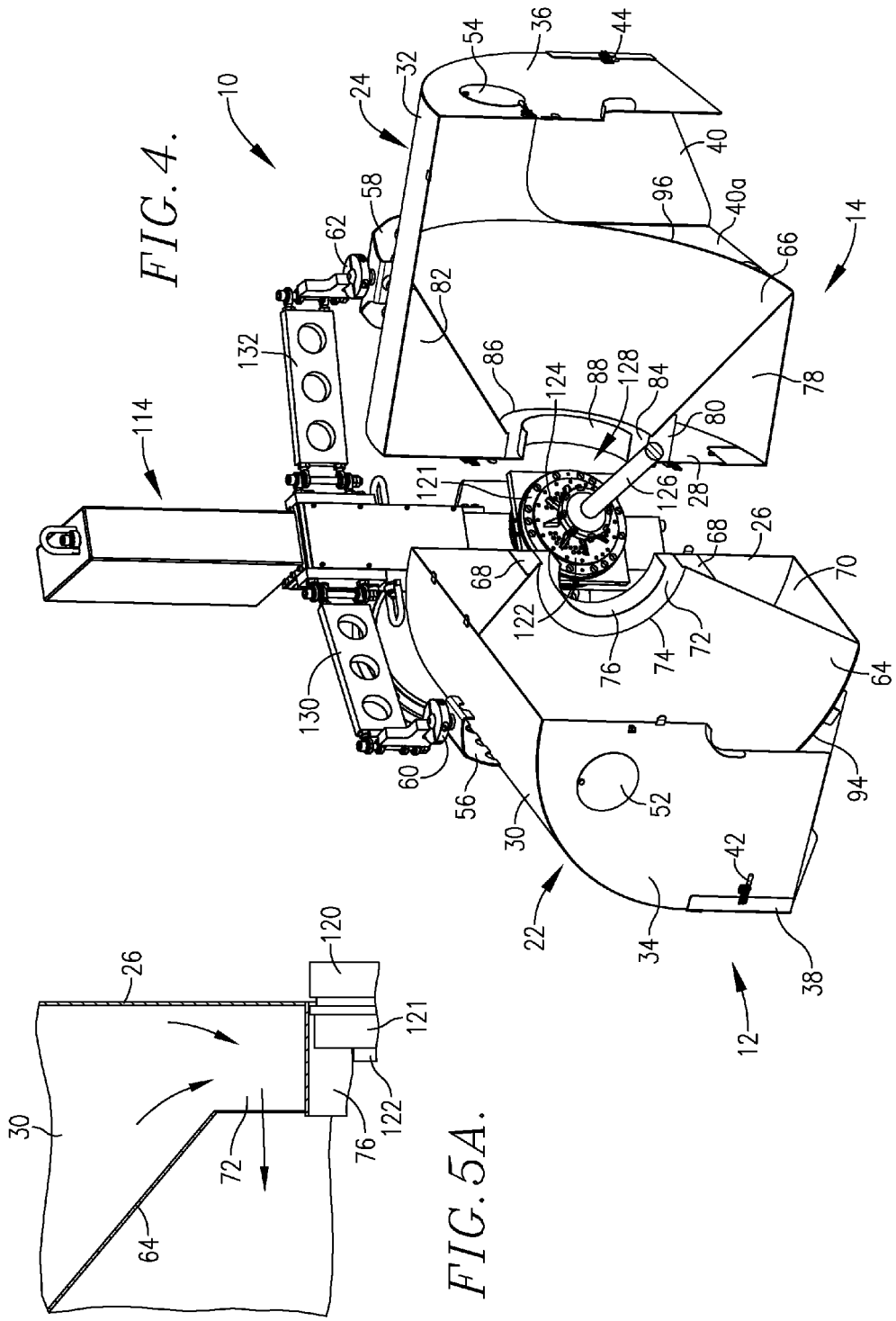
FIG. 4 is a front perspective view similar to that of FIG. 1, but illustrating the hood in its opened position permitting access to the extruder die and knife assembly.
FIG. 5A is an enlarged, fragmentary view illustrating the airflow path within the hood assembly.

Turning now to the drawings, a product-spreading dispersal hood assembly 10 is illustrated in FIGS. 1-6, and broadly includes an outer housing 12 supporting inner, generally frustoconical deflector 14, and an air delivery assembly 16. The hood assembly 10 is designed for use with devices such as extruders or pellet mills, which are equipped with a die unit to create discrete products; in the exemplary embodiment, the hood assembly 10 is used in conjunction with a conventional extruder 18. The purpose of hood assembly 10 is to maintain the discrete products in a separated condition for delivery onto a take-away device, such as an inlet belt 20 of a product dryer (see FIG. 2). In this way, the discrete products are substantially prevented from agglomerating after extrusion and during downstream drying and/or other processing.

The housing 12 is generally semicircular in overall configuration and includes a pair of shiftable housing halves 22 and 24. The halves 22, 24 are largely mirror images of each other, except for the differences described below. Thus, each housing half includes a rear end wall 26, 28, an elongated arcuate sidewall 30, 32, and a forward end wall 34, 36. The sidewalls 30, 32 have detachable, somewhat U-shaped forward panels 38, 40 secured to the sidewalls 30 and 32 by latches 42, 44. Each such panel has an inwardly extending wall segment 38a, 40a, each having an arcuate inner margin which abuts the adjacent sidewall 30 or 32. The halves 22, 24 cooperatively define the complete overall housing 12 when the walls are placed in adjacency, as illustrated in FIG. 1. In order to ensure proper attachment between the halves 22, 24, the pair of alignment tabs 46 are provided on the butt edges of the front end walls 34, 36, and a fore and aft latches 48 and 49 are provided to interconnect the halves. As depicted in FIG. 1, the front end walls 34, 36 are cooperatively designed to provide a knife drive opening 50, which is important for purposes to be described, and are also equipped with observation ports 52, 54. A bracket 56, 58 is secured to the outer surface of each sidewall 30, 32 and supports a spherical mount 60, 62.

The deflector 14 is made up of two largely mirror image, half-frustoconical walls 64, 66, with each wall being secured to and extending along the length of a corresponding housing half 22, 24 so that, when the halves 22 and 24 are closed together, the walls 64, 66 cooperatively define the substantially frustoconical deflector 14. As illustrated in FIGS. 4 and 5, the wall 64 is welded or otherwise affixed to the inner surface of sidewall 30, and is further supported by means of tabs 68 secured to rear end wall 26. As such, it will be observed that a semicircular, generally triangular in cross-section, open-ended airway 70 is defined between the outer surface of wall 64, the inner surface of sidewall 30, and the inner surface of end wall 26. A semicircular air outlet 72 is in communication with airway 70 and is defined between the inboard margin 74 of wall 64 and a semicircular collar 76, the latter being secured to and extending forwardly from rear end wall 26.

The frustoconical wall 66 is likewise secured to the inner surface of housing sidewall 32, thereby also defining a semicircular, generally triangular in cross-section airway 78 between the outer surface of wall 66, the inner surface of sidewall 32, and the inner surface of end wall 28. A lower tab 80 provides further support for the wall 66. However, at the upper end of the airway 78, a somewhat triangular panel 82 is provided which closes the upper end of airway 78. A semicircular air outlet 84 in communication with airway 78 is defined between the inner margin 86 of wall 66 and a semicircular collar 88 affixed to end wall 28.

It will be appreciated that when the halves 22, 24 are closed against each other and latched together, the abutting walls 64, 66 define the substantially frustoconical deflector 14 having a relatively small product inlet opening 90 defined by the abutting collars 76 and 88; a relatively large deflector product outlet opening 92 in spaced and opposed relationship to the opening 90 and defined by the outer margins 94, 96 of the walls 64, 66; an essentially full-circle airway 98 defined by the aligned airways 70 and 78; a circular air outlet 100 defined by the now-aligned outlets 72 and 84 in communication with airway 98; and that the sidewalls 64 and 66 forward of the outer margins 94, 96, the front walls 34, 36, and the panels 38, 40 cooperatively provide a an elongated, laterally extending, open-bottom product confinement zone 102.

The air delivery assembly 16 is designed to supply airway 98 with pressurized air, and to direct such air through the outlet 100 in a direction towards the outlet opening 92 of deflector 14. To this end, an air inlet pipe 104 is secured to sidewall 32 and is designed to receive an air conduit (not shown), supplying pressurized air for passage through airway 98 and outlet 100.

The extruder 18 in the illustrated embodiment has an elongated, tubular, multiple-head barrel including a terminal head 106, with a pair of elongated, helically flighted, axially rotatable extrusion screws 108 within the barrel. The outlet end of head 106 is equipped with a transition 110 which is secured to the inlet 112 of a back pressure valve assembly 114. The assembly 114 is itself conventional, and is designed to provide a selective degree of restriction to flow of material from the extruder barrel. The valve assembly is illustrated and described in detail in U.S. Pat. No. 6,773,739, wherein the portions thereof directed to the back pressure valve assembly 114 are incorporated by reference herein in their entireties. The outlet 116 of the assembly 114 is equipped with a transition 118, the latter supporting a circular spacer 120. A die plate support 121 is mounted on spacer 120, and in turn supports a restricted orifice die plate 122 having a plurality of die openings therethrough.

A multiple-blade rotary cutoff knife 124 is positioned against the outer face of die plate 122, and is secured to a knife shaft 126. The shaft 126 extends through the shaft opening 50 and is coupled with a conventional motor drive (not shown). It will thus be appreciated that the die plate 122 and knife 124 provide a die unit 128, which, with the overall extruder 18, provides discrete cut extrudate products.

In order to further support the housing halves 22, 24 during swinging movement thereof, a pair of hinged support arms 130, 132 are operatively connected between the back pressure valve assembly 114 and the respective spherical mounts 60, 62. In this manner, the halves 22, 24 may be easily swung between the closed position of FIG. 1 and the open, access position of FIG. 4.

In the operation of hood assembly 10, the use of air delivery assembly 16 is optional, i.e., with some products, it is unnecessary to provide air currents surrounding the die unit 128. In other instances, the air delivery assembly 16 facilitates separation of the cut extrudate.

When used, the assembly 16 may be operated at a velocity of up to about 6,000 cubic feet/minute (cfm), more usually from about 2,000-4,000 cfm, and most typically about 3,000 cfm. The air may be ambient temperature air or heated to a temperature of up to about 80° C. Ambient air is preferred for reasons of cost, and also because ambient air helps to "set" the surface of the extrudates to reduce stickiness. In any case, use of the assembly 16 also helps deflect the extrudates so that they strike the deflector 14 at a lower angle, thereby reducing the probability of agglomeration on the side of the deflector.

While the invention has been described in the context of the twin screw extruder 18, the invention is not so limited. That is, a single screw extruder could also be used or, for that matter, any other processing device, such as a pellet mill which will generate cut extrudate products. Moreover, while the support arms 130, 132 have been shown as mounted on the back pressure valve 114 assembly, this is a matter of convenience only, and such support arms, where used, may be supported on any other convenient portion of the overall apparatus.

We claim:
1. The combination comprising:
   a material processing device having an outlet die unit presenting a generally horizontal axis, the device operable to generate discrete products; and
   a product-spreading hood assembly adjacent said outlet die in order to maintain the separation of said discrete products issuing from said outlet die unit, said hood assembly comprising—
   a deflector having wall structure defining a product inlet opening with a first cross-sectional area, and a product outlet opening with a second cross-sectional area greater than said first cross-sectional area, said wall structure including a generally frustoconical wall section presenting a central longitudinal axis, said wall section located and diverging outwardly from said central longitudinal axis between said product inlet and said product outlet;

structure mounting said deflector in a generally horizontal orientation with said deflector central longitudinal axis extending substantially horizontally;

product delivery structure located proximal to said product outlet and oriented to receive products therefrom, said product delivery structure having walls presenting an open bottom so that products received from said product outlet opening gravitate through said open bottom in a direction transverse to said central longitudinal axis; and an air delivery assembly operable to direct air currents from a point proximal to said inlet opening into said first cross-sectional area in a direction towards said outlet opening, said product inlet opening located at least in part about said die unit so that said discrete products are directed into said deflector, said air currents configured to substantially maintain said discrete products in a separated condition as the products pass through said outlet opening.

2. The combination of claim 1, said air delivery assembly comprising a plenum extending at least partially about said wall structure defining said product inlet opening.

3. The combination of claim 2, said airway substantially circumscribing said wall structure proximal to said product inlet.

4. The combination of claim 1, said deflector wall structure comprising a plurality of wall segments which are movable from a closed position cooperatively defining said deflector, and an open position wherein said segments are separated.

5. The combination of claim 4, said deflector wall structure comprising a pair of half-frustoconical segments.

6. The combination of claim 1, said die unit comprising an extruder die and a knife device, and said products being cut extrudates.

7. The combination of claim 1, said processing device being an extruder.

8. The combination of claim 1, said generally frustoconical wall section extending from said product inlet opening to said product outlet opening.

9. The combination of claim 1, said material processing device comprising an extruder.

10. The combination comprising:
a material processing device having an outlet die unit presenting a generally horizontal axis, the device operable to generate discrete products; and
a product-spreading hood assembly adjacent said outlet die in order to maintain the separation of said discrete products issuing from said outlet die unit, said hood assembly comprising—
   a deflector having wall structure defining a product inlet opening with a first cross-sectional area, and a product outlet opening with a second cross-sectional area greater than said first cross-sectional area, said wall structure including a generally frustoconical wall section presenting a central longitudinal axis, said wall section located and diverging outwardly from said central longitudinal axis between said product inlet and said product outlet;
   structure mounting said deflector in a generally horizontal orientation with said deflector central longitudinal axis extending substantially horizontally;
   product delivery structure located proximal to said product outlet and oriented to receive products therefrom, said product delivery structure having walls presenting an open bottom so that products received from said product outlet opening gravitate through said open bottom in a direction transverse to said central longitudinal axis,
   said product inlet opening located at least in part about said die unit so that said discrete products are directed into said deflector; and an air delivery assembly operable to direct air currents from a point proximal to said product inlet opening into said deflector, said air currents configured to substantially maintain said discrete products in a separated condition as the products pass through the product outlet opening.

11. The combination of claim 10, said generally frustoconical wall section extending from said product inlet opening to said product outlet opening.

12. The combination of claim 10, said air delivery assembly comprising a plenum extending at least partially about said wall structure defining said product inlet opening.

13. The combination of claim 12, said airway substantially circumscribing said wall structure proximal to said product inlet end.

14. The combination of claim 10, said outlet die unit axis, and said central longitudinal axis being parallel.

15. The combination of claim 14, said outlet die unit axis and said central longitudinal axis being coincident.

* * * * *